United States Patent Office 3,107,176
Patented Oct. 15, 1963

3,107,176
NICKEL-COPPER ALLOY WELDING ELECTRODE
Charles E. Witherell, Bound Brook, N.J., assignor to The International Nickel Company, Inc., New York, N.Y., a corporation of Delaware
No Drawing. Filed Feb. 7, 1962, Ser. No. 171,577
8 Claims. (Cl. 117—205)

The present invention relates to a nickel base welding electrode, and, more particularly, to a coated nickel-copper alloy welding electrode.

Heretofore, the art has endeavored to produce a nickel-copper alloy welding electrode having good operability that was capable of producing ductile welds and/or overlays in all positions, which welds were substantially devoid of cracking and porosity even when diluted with iron. The difficulties encountered in obtaining such a combination of properties and/or characteristics are exemplified by the prior art relating thereto. For example, the earliest known nickel-copper welding electrode was designed to overcome the detrimental oxidizing action of the ambient air upon the superheated pool of molten metal in welding nickel-copper alloys with bare nickel-copper alloy weld rods. To accomplish this purpose, the rod was covered with reducing materials, e.g., titanium, to shield the welding arc from the atmosphere. The reducing materials were held to the rod by the use of a liquid shellac and they comprised between 0.5% and 10% by weight of the electrode. While this primitive coated weld rod was a giant step forward in a virgin art, it nevertheless had severe limitations particularly since its operability was poor and the weld deposits produced were somewhat porous and had a marked tendency to crack.

In order to improve upon the first known nickel-copper electrode, the art turned to the task of ameliorating its operability. This resulted in the production of an electrode having a nickel-copper core wire and a dip-coated flux which contained what are now considered as the usual slag-forming and flux-forming ingredients, e.g., calcium fluoride (fluorspar), sodium fluoride, carbon, etc. It is no doubt true that this prior art electrode had improved operability; however, this electrode did not eliminate porosity in the weld. As a matter of fact, the welds produced using this electrode were somewhat porous and cracked when diluted with even small quantities of iron. Later on, this rod was modified somewhat to permit extrusion of the flux coating; nevertheless, the extruded version had the same sensitivity to porosity and iron-dilution.

Faced with this new dilemma, the art developed still a different coated electrode to vitiate the effects of iron-dilution. This electrode partially overcame the objectionable sensitivity to iron-dilution through a decrease in the carbon content and an addition of columbium, but it decreased the operability characteristics of the electrode, particularly in out-of-position welding. In addition, the columbium-containing electrode had a strong tendency towards porosity in the restrike areas.

Thus, it is clear from the history of nickel-copper welding electrodes that the art has had to sacrifice at least one advantageous characteristic and/or property to eliminate a deleterious characteristic and/or property. In view thereof, industry has heretofore been forced to keep a supply of each type of electrode in order to satisfy each of its particular needs. Furthermore, none of the aforementioned prior art electrodes has good operability in every position, nor do they produce the ultra-high quality welds and/or overlays now required by industry particularly in certain critical applications.

Although many attempts were made to overcome the foregoing difficulties and other disadvantages, none, as far as I am aware, was entirely successful when carried into practice commercially on an industrial scale.

It has now been discovered that strong, ductile, non-porous, sound welds and overlays, including iron-diluted welds and overlays, can be produced in all positions by employing a specially coated nickel-copper alloy welding electrode.

It is an object of the present invention to provide an improved coated welding electrode which has a nickel-copper alloy core wire and has a special flux coating, which electrode contains, in novel combination, special proportions of ingredients and which is particularly adapted for use in all positions.

It is also an object of the present invention to provide a coated nickel-containing welding electrode which has a highly effective arc-shield, a stable arc and which produces a readily removable friable slag.

It is a further object of the invention to provide a nickel-copper alloy core wire with a durable coating that is substantially resistant to damage during normal handling and/or use.

Still another object of the invention contemplates an improvement in the process for welding and/or overlaying similar and dissimilar metals and alloys with welds which are substantially free of cracks and porosity even when diluted with appreciable amounts of iron.

It is also the purpose of this invention to provide an improved process for welding metals and alloys which are subjected to severe restraint with welds which are both substantially crack-free and non-porous.

Among the further objects of the present invention is the provision of a process for overlaying similar and dissimilar metals and alloys in any position, including the overhead and vertical positions.

Other objects and advantages will become apparent from the following description.

Broadly stated, the present invention contemplates an all-position, coated welding electrode having a nickel-base core wire and a flux coating. In general, the core contains about 15% to about 45% copper, up to about 10% iron, up to about 8% manganese, up to about 1.5% silicon, about 1% to about 4% aluminum, about 0.3% to about 3% titanium, up to about 0.12% carbon, up to about 2.5% columbium and the balance, apart from the usual deoxidants and impurities, essentially nickel, with the nickel content being at least about 50%. The core wire may also contain a small amount of cobalt, e.g., up to about 5%, although advantageously the cobalt content does not exceed about 0.1%. The flux of the nickel-copper alloy welding electrode is a special flux containing controlled amounts of manganese carbonate, cryolite and titanium dioxide, with each constituent of the flux being in a special proportion with the other constituents thereof. The electrode, i.e., the core wire and flux, contains metallic manganese in a range of about 0.5% to about 7% by weight of the electrode and silicon in a range of about 0.1% to about 1.3% so that together with the special constituents of the flux and the nickel-copper alloy core wire an arc-welding electrode is obtained which provides sound, substantially crack-free welds and/or overlays even when appreciably diluted with iron. Optionally, up to about 4% columbium can be included in the electrode. In general, the manganese, the silicon and any columbium may be present partly in the flux and partly in the core or may be present entirely in the core or entirely in the flux, under appropriate circumstances, as is pointed out hereinafter. The special electrode containing a unique combination of ingredients in special proportions has good arc behavior and satisfactory slagging characteristics in all positions, including the overhead and vertical positions, besides producing welds that are sound, smooth and substantially free from cracks.

The dry flux of the coating contemplated by the present invention contains the following ingredients in the amounts set forth (in parts by weight of the dry flux).

TABLE I

| Ingredients: | Range |
|---|---|
| Manganese carbonate | 10 to 80 |
| Alkaline earth metal carbonate, e.g., calcium carbonate, barium carbonate, strontium carbonate and combinations thereof | Up to 40 |
| Manganese carbonate plus any alkaline earth metal carbonate | 10 to 80 |
| Cryolite | 5 to 30 |
| Titanium dioxide | 10 to 35 |

From Table I, it is to be noted that up to about 40 parts of alkaline earth metal carbonate may be substituted part for part for some, but not all, of the manganese carbonate in the flux. Thus, the flux must always contain at least 10 parts by weight of the chemical compound manganese carbonate. Furthermore, when no alkaline earth metal carbonate is present in the flux, the manganese carbonate is present in the range of about 10 parts to about 80 parts by weight of the dry flux.

The electrode coating having the composition of ingredients hereinbefore set forth in Table I affords optimum operability and in conjunction with the core wire and other ingredients of the electrode provides the desired high level of weld quality in combination with excellent operability. Each ingredient of the flux coating and the core wire serves a particular function with each and every other ingredient of the electrode. The cryolite, for example, should be present in the flux in combination with the remainder of the ingredients of the electrode in the amounts set forth in Table I as it has been found to be an effective fluxing agent and an aid in dissolving oxides and maintaining a low level of non-metallic inclusion in the weld metal. Cryolite helps eliminate oxides, promotes weld soundness and is very helpful in imparting the proper viscosity and surface tension to the slag to control the molten weld metal in the vertical and overhead positions. On the other hand, if more than 30 parts of cryolite are present in the flux the operability of the electrode deteriorates since it causes a melting back to the cone-shaped shield of flux formed at the tip of the electrode which, of course, exposes the core wire to the deleterious effects of the ambient atmosphere.

The titanium dioxide should be present in the flux in combination with the remainder of the electrode in amounts from about 10 to about 35 parts by weight of the flux since it provides good arc stability and slagging characteristics. Too little titanium dioxide produces a powdery slag which is difficult to remove. Excessive quantities of titanium dioxide increases the level of weld cracking and should be avoided.

The total carbonate in the flux, that is, manganese carbonate and alkaline earth metal carbonate, must be present in the range of about 10 parts to about 80 parts by weight of the flux to insure optimum operability and slag behavoir of the electrode. When more than the maximum amount of carbonates is used the slag tends to become powdery and crumbly and thus very difficult to remove. When less than about 10 parts of total carbonate are present, the slag is inadequate, protection of the arc is deficient and the arc becomes unstable. The amounts of manganese carbonate specified in Table I are also essential. Without this ingredient slag removal is very difficult. Thus, if too much or too little manganese carbonate is present in the flux the operability and slag characteristics of the flux are affected adversely. The alkaline earth metal carbonate, advantageously, calcium carbonate, where substituted part for part for some of the manganese carbonate in the flux should be present in combination with the remainder of the flux within the range specified in Table I and, advantageously, in amounts from about 10 parts to about 30 parts by weight of the dry flux, in order to form, upon decomposition, a gaseous protective envelope surrounding the arc. Thus, it helps protect the superheated metal in its transfer from electrode tip to weld puddle from the harmful effects of the ambient atmosphere.

In addition, extrudability aids such as bentonite or other similar colloidal clays, and humectants such as alginates, gums, glycolates, sodium carboxymethyl cellulose, etc., can be added to the dry flux in amounts totaling up to about 5 parts by weight of the flux to improve the extrudability of the flux.

The core of the electrode contemplated by this invention is, as was mentioned before, a nickel-copper alloy core wire containing, by weight, about 15 to about 45% copper, about 1 to about 4% aluminum, about 0.3 to about 3% titanium, up to about 0.12% carbon, up to about 8% manganese, up to about 1.5% silicon, up to about 2.5% columbium with the balance essentially nickel. The core wire forms the great bulk of the alloy deposit and each element included therein in combination with the remainder of the electrode must be present in the amounts hereinbefore set forth. For example, the nickel and copper, of course, should be present in the amounts hereinbefore set forth since they provide an alloy composition having good corrosion resistance, strength, ductility, etc.

The aluminum and titanium must also be present in the core wire in the amounts hereinbefore set forth since too low a level of either of them causes extensive restrike porosity and extensive bead porosity. While the titanium and aluminum contents can be increased over their maximums without adversely affecting the operability of the electrode, their presence causes the core wire to be very difficult to work and thus each of them should be kept at or below the 3% level.

The carbon content of the core wire should not exceed about 0.12% as otherwise the weld deposits and/or overlays produced using the electrode will have a tendency to hot crack, particularly where dilution thereof with iron occurs. A low amount of carbon, for example about 0.05%, helps to increase the strength of the weld deposit.

Advantageously, the core wire has a composition as shown in Table II (in weight percent of the core).

TABLE II

| Element | Advantageous range | Example |
|---|---|---|
| Nickel | Balance | 64.8 |
| Copper | 27 to 33 | 30 |
| Aluminum | 1 to 2.5 | 1.5 |
| Titanium | 0.5 to 2 | 1.5 |
| Manganese | 0.5 to 1.5 | 1 |
| Iron | Up to 3 | 1 |
| Carbon | Up to 0.08 | <0.08 |
| Silicon | 0.1 to 0.3 | 0.2 |

In carrying the invention into practice, it is advantageous to use the particular ingredients of the dry flux in the amounts set forth in the following Table III (in parts by weight of the dry flux).

TABLE III

| Preferred ingredients | Range | Example |
|---|---|---|
| Manganese carbonate | 10 to 20 | 15 |
| Calcium carbonate | 10 to 30 | 21 |
| Cryolite | 10 to 22 | 17 |
| Titanium dioxide | 15 to 30 | 22 |
| Manganese [1] | 5 to 12 | 8 |
| Columbium [2] | Up to 8 | 6 |
| Silicon [3] | 0.6 to 1.8 | 1.2 |
| Bentonite | 2 to 5 | 3 |

[1] For example, as electrolytic manganese powder.
[2] For example, as a ferrocolumbium alloy containing about 60% columbium by weight.
[3] For example, as a nickel-silicon alloy containing about 30% silicon, about 1% calcium, with the balance essentially nickel.

The ingredients used in making the flux are powdered ingredients. In general, the mixed ingredients usually have a particle size of between about 50 microns and about 300 microns, although flux ingredients having a different particle size can also be used, as those skilled in the art will readily appreciate.

A water dispersible binder ordinarily is employed with the flux coating to provide a durable and hard coating on the nickel-copper alloy core wire after drying and baking. The binder advantageously is of the silicate type as it produces a durable coating that does not require a rebake prior to use. The silicate type binder may be an aqueous solution of sodium silicate and/or potassium silicate. The following Table IV gives the amounts (in parts by weight of the dry flux) of ingredients which can be used for the binder. It is to be noted, however, that a silicate solution of a different specific gravity than shown herein also can be used.

TABLE IV

| Ingredient | Range | Example |
|---|---|---|
| Sodium silicate solution (47° Baume) | 10 to 20 | 15 |
| Water | (¹) | 2 |

¹ As needed for extrudability.

The flux coating can be applied to the core wire in any suitable manner, e.g., by an extrusion process, and dried on the wire surface by suitable drying and/or baking. This results in a hard adherent coating of high mechanical strength which is relatively resistant to mechanical damage under normal handling conditions. A satisfactory drying or baking treatment of the flux and binder mixture comprises a normal continuous oven drying treatment followed by a baking treatment which comprises gradually raising the temperature to about 600° F. and holding at that level for about two hours.

Examples of typical electrode dimensions (core diameter plus flux thicknesses) are given in Table V. All dimensions therein contained are in inches.

TABLE V

| Core diameter | Electrode diameter, Range | Electrode diameter, example |
|---|---|---|
| 3/32 | 0.12 to 0.15 | 0.13 |
| 1/8 | 0.17 to 0.2 | 0.18 |
| 5/32 | 0.21 to 0.23 | 0.22 |
| 3/16 | 0.25 to 0.27 | 0.26 |

However, it is permissible, as will be apparent to those skilled in the art, to vary considerably the thicknesses of core diameter and flux from those proportions given in the preceding table. In most cases, the flux coating usually constitutes from about 25% to about 35% by weight of the electrode.

The compositions of the deposits and/or overlays, of course, will vary somewhat depending upon the exact composition of the flux, the composition of the core wire and the composition of the base metal being welded. Furthermore, the combination of any of the flux compositions of Tables I and III with any of the compositions of the core wire in the broad range or in the advantageous ranges and example of Table II are within the scope of this invention. However, all weld deposits produced using the electrode of this invention will have compositions in the range shown in Table VI.

TABLE VI

| Ingredients | Range | Advantageous range | Example |
|---|---|---|---|
| Nickel | Bal | Bal | 61.9 |
| Copper | 15 to 45 | 27 to 33 | 30 |
| Iron | 0 to 40 | Up to 3 | 1.0 |
| Manganese | 0.5 to 8 | 2 to 4 | 4 |
| Silicon | 0.1 to 1.3 | 0.4 to 1.0 | 0.8 |
| Aluminum | Up to 1.5 | Up to 0.5 | 0.2 |
| Titanium | Up to 1.5 | Up to 0.8 | 0.6 |
| Columbium | Up to 4 | Up to 2.0 | 1.5 |
| Carbon | Up to 0.08 | Up to 0.03 | 0.01 |

It is also within the scope of this invention to employ electrodes having flux cores or comprised of powdered metal compacts within a thin metallic sheath. In addition, the alloy additions, e.g., silicon, manganese and any columbium, may be present entirely in the core or entirely in the flux. Thus, silicon, manganese and/or any columbium in powdered form can be added to the flux composition of Table I in such amounts that the composition of the weld deposits will fall within the ranges tabulated in Table VI, e.g., manganese may be present in amounts (by weight of the dry flux) up to about 20 parts, e.g., 5 parts to 12 parts. This metallic manganese is in addition to the manganese present as the manganese carbonate in the flux. Silicon up to 2.4 parts for example 0.6 to 1.8 parts and columbium (including incidental tantalum) up to about 9 parts, e.g., up to about 6 parts may also be present in the flux. However, in all cases, manganese is present in the electrode in a range from about 0.5% to about 7%, by weight of the electrode, and, advantageously, from about 2% to about 4% of the electrode. The metallic manganese in the range hereinbefore set forth increases the tensile strength of the nickel-copper alloy weld metal and also reduces the incidence of cracking particularly in highly restrained heavy section weldments. In addition, in all cases, silicon must be present in the electrode in amounts from about 0.1% to about 1.3% by weight of the electrode, and, advantageously, from about 0.4% to about 1%. Silicon in the aforementioned range improves the weld strength as does the manganese. In addition, silicon is particularly advantageous in decreasing weld cracking and improving weld ductility through its strengthening effect on the copper-rich portions of the weld grain structure. If the maximum silicon content in the electrode is exceeded the silicon has a reverse function and increases weld cracking. Silicon is advantageously employed as a nickel-silicon alloy containing about 0.5% to about 1.5% calcium, about 25% to about 35% silicon with the balance essentially nickel. However, while ferrosilicon may also be used it suffers from the disadvantage of usually containing higher quantities of oxygen which are, of course, detrimental.

For the purpose of giving those skilled in the art a better understanding of the invention and a better appreciation of the advantage of the invention, the following illustrative examples are given:

*Example I*

An electrode was prepared from a core wire containing about 30% copper, about 1% iron, about 1% manganese, about 0.2% silicon, about 1.5% aluminum, about 1.5% titanium, about 0.01% carbon, and about 64.8% (balance) nickel. The core wire was coated with the flux composition set forth under "Example" in Table III, by extrusion, using a binder consisting of about 15 parts by weight of sodium silicate solution (about 47° Baumé) and about 2 parts by weight of water. The electrode thus constituted was oven dried and subsequently baked at about 600° F. for about 2 hours.

*Example II*

A butt weld was made in the flat position between two pieces of nickel-copper alloy plate 5 inches wide by 15 inches long by 1¼ inch thick (5" x 15" x 1¼"). Each plate was made from an alloy containing 0.15% carbon, 1.17% manganese, 1.2% iron, 0.21% silicon, 31% copper, 0.014% aluminum, 0.012% titanium, 0.05% magnesium, and 66.2% (balance) nickel. The joint preparation for one 15" edge of each plate conformed to that of MIL-E-17496-D Military Specification, FIGURE 3. This joint design consisted of a 30° bevel for the lower ½ inch of the plate thickness, and a 15° bevel for the upper ¾ inch of the plate thickness. A $\frac{1}{16}$ inch land was left at the root of the joint. Thus, when butted together, the two joint halves formed a double-beveled V-groove joint having a 60° angle between the two members for the lower ½" of the joint, and the V angle changing abruptly to 30° at a point ¾" from the top of the joint. A $\frac{3}{32}$ inch root spacing was provided, and the joint was clamped securely with three heavy U-strap clamps on each side to a 6" thick steel welding platen having a grooved copper backing strap centered under the root of the joint. Three restraining wedges of carbon steel, machined to fit snugly into the double-beveled V-groove configuration, were positioned one on each end of the joint and one at the middle to afford maximum restraint and to prevent warpage during welding.

An electrode having the composition set forth in Example I and having the diameter as shown in Table V, supra, for a $\frac{3}{16}$ inch diameter core wire was used to weld the joint. After the plates had been welded, the joint was released from the table, turned over, back chipped and a sealing pass was then deposited on the root side. The joint was then X-rayed using a 2% sensitivity penetrameter as defined in the Welding Handbook, 1957, section 1-8.39, published by the American Welding Society, and no evidence of porosity, trapped slag or cracking was observed. After X-raying, the joint was cross-sectioned in such a manner that one-half of the weld was sectioned transversely to provide six cross-sectional slices ⅜ inch wide for side-bend tests. The weld deposit on the other half of the joint was cut from the plate and machined into a standard 0.505 inch diameter, all-weld-metal tensile test specimen.

The six transverse slices were each polished on both sides using a fine-grained, rubber-bonded abrasive wheel and etched with dilute nitric acid to outline the weld structure. These polished and etched sections were subsequently examined on both sides at a magnification of thirty diameters (30X) for evidence of weld defects. Five of the six cross-sections were completely free of cracks, fissures, porosity or any other defects of any kind whatsoever. One side of one of the six specimens contained only two extremely small fissures, e.g., one was $\frac{1}{64}$" long and the other $\frac{3}{64}$" long, which is more than satisfactory under such severe restraints. Thus, this high level of weld quality under the previously described highly demanding conditions, demonstrates the capability of the electrode of the invention to provide welds of exceptional soundness in even highly restrained, unusually thick sections.

After examining the six cross-sectional slices, they were each subjected to a side-bend test, i.e., each slice was bent 180° over a steel pin having a diameter equal to four times the specimen thickness (4" x ⅜"=1½" diameter pin). The specimens were bent so that the cross-section of the weld was in transverse tension. At the completion of the test, i.e., when the "legs" of the bend specimen were substantially parallel, the bent surfaces were examined once again for defects. These examinations were conducted at 15X. In the six side-bends, none had any cracks, fissures or open defects larger than $\frac{3}{32}$ inch in length. One specimen had only one cold tear while another had two cold tears and each cold tear was no longer than about $\frac{1}{16}$ inch to about $\frac{3}{32}$ inch in length. Thus, even after the extremely severe side-bend tests, there was an unusually and remarkably small number of defects. This again demonstrates the soundness of the weld deposit and its ductility even under the most adverse circumstances.

The all-weld-metal tensile specimen was tested at room temperature with the results shown in the following Table VII.

TABLE VII

| | |
|---|---|
| Specimen diameter, inch | 0.5063 |
| Specimen area, sq. in | 0.2013 |
| Break load, lbs | 15,750 |
| Ultimate tensile strength, p.s.i | 78,200 |
| Yield load (0.2% offset), lbs | 8,820 |
| Yield strength (0.2% offset), p.s.i | 43,800 |
| Elongation in 2", percent | 45 |
| Reduction in area, percent | 43 |

This tensile test further indicates that the deposits of the electrode of this invention are strong as well as being ductile, and are, in fact, even stronger than a hot-rolled and annealed nickel-copper alloy plate containing 0.15% carbon, 1.1% manganese, 1% iron, 0.21% silicon, 31% copper with the balance essentially nickel. This plate had an ultimate tensile strength of about 75,000 p.s.i. and a 0.2% yield strength of about 35,000 p.s.i. when tested at room temperature.

*Example III*

A butt weld was also made in substantially identical circumstances as in Example II with the only exception being that the electrode used had a diameter as shown in Table V, supra, for a $\frac{5}{32}$ inch core wire. The X-ray of this joint also exhibited freedom from porosity and other defects. In addition, the side-bend specimens after testing in the manner described in Example II showed even fewer defects than the weld made with the electrode having a $\frac{3}{16}$ inch core wire. This was accomplished without any loss of ductility and/or strength since the all-weld-metal tensile, yield and ductility values were essentially the same as those recited in Table VII of Example II.

*Example IV*

A flat-position butt weld, similar to that of Example II, was made between one plate of nickel-copper alloy having the same composition as the nickel-copper plates of Example II and one plate of a carbon steel containing 0.35% manganese, 0.04% sulphur, 0.15% carbon, 0.01% phosphorus, balance essentially iron. Each plate was 5 inches wide by 15 inches long by 1¼ inch thick (5" x 15" x 1¼"). The same joint preparation, restraint, welding procedure, electrode composition and size as employed in Example II were also utilized for this weldment.

After welding, the joint was X-rayed at a sensitivity of 2%. No porosity, cracking or trapped slag was observed in the X-ray despite the iron-dilution from the carbon steel plate. The weld was then sectioned in the manner described in Example II to provide six-cross-sectional slices ⅜ inch thick for side-bend tests and an all-weld-metal tensile test specimen. The side-bend slices were prepared for an examination prior to bending, as fully described in Example II. In an examination at 30X of both sides of each of the six slices, all sections were found to be absolutely free of cracks, fissures, porosity or defects of any kind whatsoever.

When these examinations were complete, the slices were given side-bend tests. After bending through 180°, the bent surfaces were examined at 15X. None of the side-bend slices contained defects larger than $\frac{1}{16}$ inch long, and, as a matter of fact, only one section had a defect that long. There was an average of only about 2 defects (cold tears) between 1/64 inch and 1/32 inch in length per section even though the weld was appreciably diluted with iron. This exceptionally high quality level in a weld made under such severe conditions, demonstrates further the capability of this electrode to produce high quality welds, as well as its unexpected compatibility for joining nickel-copper alloys to ferrous materials with no deterioration in quality.

The all-weld-metal tensile test specimen was tested at room temperature and yielded the results set forth in Table VIII.

TABLE VIII

| | |
|---|---|
| Specimen diameter, inch | 0.5053 |
| Specimen area, sq. in | 0.2005 |
| Break load, lbs | 16,050 |
| Ultimate tensile strength, p.s.i | 80,000 |
| Yield load (0.2% offset), lbs | 8,790 |
| Yield strength (0.2% offset), p.s.i | 43,800 |
| Elongation in 2", percent | 46 |
| Reduction in area, percent | 43 |

The foregoing Table VIII clearly illustrates the ductility and strength of the welds made using the electrodes of this invention even where the weld is appreciably diluted with iron.

*Example V*

A weldment was made similar in all respects to Example IV with the exception that the electrode used had a diameter as shown in Table V, supra, for a 5/32 inch core wire. The X-ray at a 2% sensitivity of this weld was also entirely free of cracks, porosity or any other defects. After bending, only one of the six side-bend test specimens contained a defect larger than 1/32 of an inch and this was merely a tear of only about 1/16 inch long. The six side-bend specimens had an average of about 1.5 defects per specimen between 1/64 inch and 1/32 inch long. Under such severe and rigid testing, these results are more than adequate. In fact, they are unexpectedly excellent. The all-weld-metal tensile, yield and ductility values were essentially the same as those for the weld made with the electrode having a 3/16 inch diameter core wire.

*Example VI*

To further demonstrate the tolerance for iron of the deposits produced by the electrodes of this invention, an overlay was deposited on a 3/8 inch by 3 inches by 6 inches carbon steel plate containing 0.38% manganese, 0.03% sulphur, 0.17% carbon, 0.015% phosphorus, and balance essentially iron. The electrode used had the composition for flux and core wire as set forth in Example I. In addition, the diameter of the electrode was as shown in Table V, supra, for a 3/16 inch core wire. The plate was cleaned of scale and rust and clamped to a 1½" thick steel welding table with four C-clamps. An overlay six beads wide and two layers high was deposited directly on the steel plate. After overlaying, the top surface of the deposit was ground smooth to remove the bead ripples and then polished on a fine-grained, rubber-bonded, abrasive wheel.

The underside of the carbon steel plate was machined to provide a total thickness, including the overlay deposit, of 3/8 of an inch. The overlay specimen was then given a 180° longitudinal face bend over a 1½" diameter steel pin. When the two extremities of the bend specimen were parallel, the test was stopped and the bent specimen's surface was subjected to examination at 15×. The examination revealed that the bent specimen was completely free of defects of any kind which clearly indicates a high tolerance for dilution by iron. In addition, it indicates the complete suitability of this electrode for welding ferrous metals to nickel-copper alloys or for overlaying ferrous metals with the nickel-copper alloys produced by the electrodes of this invention.

*Example VII*

Three additional overlays on carbon steel were made using electrodes having compositions substantially identical to Example I. Each of the overlays was made in a manner identical to that of Example VI. In one case, however, the electrode had a diameter as shown for the 5/32 inch core wire in Table V. The other two electrodes had a 1/8 inch core wire and a 3/32 inch core wire respectively, and the total diameter of each, i.e., core wire plus flux, was as is shown in Table V for electrodes of those core diameters. All of these overlays were completely free of defects after 180° bend tests.

*Example VIII*

A butt joint comprising two nickel-copper alloy plates having a composition as set forth for the nickel-copper alloy plates of Example II was prepared for welding in the overhead position. Each plate was ½ inch thick by 5 inches wide by 10 inches long. One 10" edge of each of the plates was given a 40° bevel with a 1/16 inch land at the root. These plates were then positioned ¼ inch apart. They were then tacked to a 3/8 inch thick by 2 inches wide by 10 inches long nickel-copper alloy backing strip. The plates were then clamped upside down to a 1½ inch thick steel plate which was 8 inches wide and 4 feet long. The steel plate was suspended in a horizontal position about seven feet from the floor.

A welding electrode having a 5/32 inch core wire and having a total diameter of about 0.22 inch was used. The composition of the electrode was as set forth in Example I. All welding, removal of slag and any grinding which was necessary were done with the weld joint clamped to the steel plate in the overhead position. The weldment was not removed from its restraining support until after the last bead had been deposited.

After welding, the 3/8 inch thick backing strip was machined off flush with the back side of the ½ inch welded plates. The joint was then X-rayed to 2% sensitivity. The X-ray indicated the weld to be essentially free of porosity, trapped slag or other defects of any other kind whatsoever. This high level of soundness, even in a butt weld made in the extremely difficult overhead position with a relatively large diameter electrode, indicates the versatility and overall excellent operability of the electrodes of this invention.

*Example IX*

In order to show the effect of manganese on weld quality an X-weld crack test was used to evaluate the weld deposits. The weld test specimen consisted of two 3" x 1" square bars between which a weld was deposited. Each bar contained 66.28% nickel, 31% copper, 0.94% manganese, 0.033% magnesium, 0.23% silicon, 0.15% carbon and 1.35% iron. The two bars were butted together along the 3" length so that the adjoining surfaces of the two bars formed a double-V-groove configuration. Weld passes were deposited two at a time on alternate sides and the specimen was allowed to cool to below 200° F. between each set of passes. After welding, the specimen was sectioned in two places 1" apart for macroexamination. The four cross-sectional faces resulting from the two cuts were then polished on a fine-grained, rubber-bonded abrasive wheel, etched with dilute nitric acid to reveal the weld grain structure and examined at 30× for evidence of cracks. This test provides extremely high restraint and has served as a reliable index for determining susceptibility to cracking of high nickel alloy weld deposits. The results of this test using electrodes having the composition hereinafter set forth are tabulated in Table IX.

TABLE IX

| Weld No. | Flux coating composition, percent [1] | | | | | | Percent Mn in weld | X-weld cracks per section |
|---|---|---|---|---|---|---|---|---|
| | CaCO₃ | Na₃AlF₆ | TiO₂ | MnCO₃ | Mn | Bentonite | | |
| 1 | 30 | 29 | 29 | 9 | 0 | 3 | 1.61 | 6.0 |
| 2 | 27 | 26 | 26 | 18 | 0 | 3 | 2.30 | 4.3 |
| 3 | 26 | 24 | 24 | 18 | 5 | 3 | 3.38 | 2.5 |
| 4 | 24 | 23 | 22 | 18 | 10 | 3 | 4.57 | 0.5 |
| 5 | 22 | 21 | 21 | 18 | 15 | 3 | 5.68 | 0.5 |

[1] In each case the core wire contained 67.5% nickel, 0.04% carbon, 0.74% manganese, 0.36% iron, 29.07% copper, 0.11% silicon, 0.42% titanium, 1.64% aluminum, and 0.022% magnesium.

The "crack count" listed in Table IX for each weld test represents the average number of cracks observed at 30× in the 4 X-weld cross sections from each test specimen.

As was clearly shown in the foregoing table, the maximum benefit from manganese is reached at about 4.5% in the weld deposit.

*Example X*

In order to show the effect of silicon on weld cracking, X-weld tests similar to those described in Example IX were conducted with the results as shown in Table X.

TABLE X

| Weld No. | Flux coating composition, percent [1] | | | | | Percent Si in weld metal | X-weld cracks per section |
|---|---|---|---|---|---|---|---|
| | CaCO₃ | Na₃AlF₆ | TiO₂ | NiSi | Bentonite | | |
| 6 | 52 | 20 | 25 | 0 | 3 | 0.2 | 7.0 |
| 7 | 50 | 20 | 25 | 2 | 3 | 0.6 | 3.0 |
| 8 | 48 | 20 | 25 | 4 | 3 | 0.9 | 1.2 |
| 9 | 46 | 20 | 25 | 6 | 3 | 1.0 | 5.0 |
| 10 | 44 | 20 | 25 | 8 | 3 | 1.2 | 11.2 |

[1] The core wire contained 64.74% nickel, 30.97% copper, 1.09% manganese, 0.1% iron, 0.06% silicon, 0.01% carbon, 1.57% titanium, and 1.43% aluminum.

From Table X it is clear that a certain amount of silicon decreases weld cracking. Actually, the addition of silicon is capable of eliminating the 0.5 crack per section in a X-weld which were still present at the optimum manganese level. However, further additions beyond that amount needed to eliminate the cracking still present at the optimum manganese level, will increase cracking.

The present invention is applicable to the welding and overlaying of nickel and iron alloys containing up to 100% nickel, up to 100% iron, up to about 100% copper, up to about 0.35% carbon, up to about 30% cobalt, up to about 5% silicon, up to about 30% manganese, up to about 30% chromium and up to about 5% each of aluminum and titanium. For example, the present invention is particularly suited for the welding of nickel-copper alloys to themselves; for joining these alloys to steel and for overlaying such materials on steel; for welding the clad side of nickel-copper alloy clad steels and for joining nickel-copper alloys, mild steel, AISI 200, 300, 400 and 500 steels to each other or to themselves in all positions with freedom from such detrimental characteristics as porosity and hot-cracking even when appreciable dilution of the weld with iron is encountered. The high level of weld quality made possible through the employment of the electrodes of this invention permits the use of arc-welding techniques in even the most critical applications, where assurance of top quality is of the utmost importance.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the present invention and appended claims.

I claim:

1. A welding electrode having a core wire containing about 30% copper, about 1% iron, about 1% manganese, about 0.2% silicon, about 1.5% aluminum, about 1.5% titanium, less than about 0.08% carbon with the balance essentially nickel and having a flux containing, in parts by weight, about 15 parts manganese carbonate, about 21 parts calcium carbonate, about 17 parts cryolite, about 22 parts titanium dioxide, about 8 parts manganese, about 6 parts columbium, about 1.2 parts silicon, about 3 parts bentonite and a silicate type binder.

2. A welding electrode having a core wire containing about 30% copper, about 1% iron, about 1% manganese, about 0.2% silicon, about 1.5% aluminum, about 1.5% titanium, about 0.01% carbon with the balance essentially nickel and having a flux containing, in parts by weight, about 10 to about 20 parts manganese carbonate, about 10 to about 30 parts calcium carbonate, about 10 to about 22 parts cryolite, about 15 to about 30 parts titanium dioxide, about 5 to about 12 parts manganese, up to about 6 parts columbium, about 0.6 to about 1.8 parts silicon and about 2 to about 5 parts bentonite.

3. A welding electrode having a core wire containing about 27% to about 33% copper, about 1% to about 2.5% aluminum, about 0.5% to about 2% titanium, about 0.5% to about 1.5% manganese, up to about 3% iron, up to about 0.08% carbon, about 0.1% to about 0.3% silicon with the balance essentially nickel and having a flux containing, in parts by weight, about 10 to about 20 parts manganese carbonate, about 10 to about 30 parts calcium carbonate, about 10 to about 22 parts cryolite, about 15 to about 30 parts titanium dioxide, about 5 to about 12 parts manganese, up to about 6 parts columbium and about 0.6 to about 1.8 parts silicon.

4. A welding electrode having a core wire containing about 27% to about 33% copper, about 1% to about 2.5% aluminum, about 0.5% to about 2% titanium, about 0.5% to about 1.5% manganese, up to about 3% iron up to about 0.08% carbon, about 0.1% to about 0.3% silicon with the balance essentially nickel and having a flux containing, in parts by weight, about 10 to about 80 parts manganese carbonate, up to about 40 parts alkaline earth metal carbonate selected from the group consisting of calcium carbonate, barium carbonate, strontium carbonate and combinations thereof, the sum of the manganese carbonate and any alkaline earth metal carbonate being about 10 to about 80 parts, about 5 to about 30 parts cryolite, about 10 to about 35 parts titanium dioxide, up to about 20 parts metallic manganese, up to about 2.4 parts silicon and up to about 9 parts columbium; said electrode containing about 0.5% to about 7% manganese by weight of the electrode, about 0.1% to about 1.3% silicon by weight of the electrode and up to about 4% columbium by weight of the electrode.

5. A welding electrode having a core wire containing about 15% to about 45% copper, up to about 10% iron, up to about 8% manganese, up to about 1.5% silicon, about 1% to about 4% aluminum, about 0.3% to about 3% titanium, up to about 0.12% carbon, up to about 2.5% columbium, up to about 5% cobalt and the balance, apart from the usual deoxidants and impurities, essentially nickel, with the nickel content being at least about 50% and having a flux containing, in parts by weight, about 10 to about 20 parts manganese carbonate, about 10 to about 30 parts calcium carbonate, about 10 to about 22 parts cryolite, about 15 to about 30 parts titanium dioxide, about 5 to about 12 parts manganese, up to about 6 parts columbium and about 0.6 part to about 1.8 parts silicon; said electrode containing about 0.5% to about 7% manganese by weight of the electrode, about 0.1% to about 1.3% silicon by weight of the electrode and up to about 4% columbium by weight of the electrode.

6. A welding electrode having a core wire containing about 15% to about 45% copper, up to about 10% iron, up to about 8% manganese, up to about 1.5% silicon, about 1% to about 4% aluminum, about 0.3% to about 3% titanium, up to about 0.12% carbon, up to about 2.5% columbium, up to about 0.1% cobalt and the balance essentially nickel with the nickel content being at least about 50% and having a flux containing, in parts by weight, about 10 to about 80 parts manganese carbonate, up to about 40 parts calcium carbonate, the sum of the manganese carbonate and any calcium carbonate being about 10 to about 80 parts, about 5 to about 30 parts cryolite, about 10 to about 35 parts titanium dioxide, up to about 20 parts manganese, up to about 2.4 parts silicon and up to about 9 parts columbium; said electrode containing about 2% to about 4% manganese by weight of the electrode and about 0.4% to about 1% silicon by weight of the electrode.

7. A welding electrode having a core wire containing about 15% to about 45% copper, up to about 10% iron, up to about 8% manganese, up to about 1.5% silicon, about 1% to about 4% aluminum, about 0.3% to about 3% titanium, up to about 0.12% carbon, up to about 2.5% columbium, up to about 5% cobalt and the balance essentially nickel in amounts of at least about 50% and having a flux containing, in parts by weight, about 10 to about 80 parts manganese carbonate, up to about 40 parts alkaline earth metal carbonate, the sum of the manganese carbonate and any alkaline earth metal carbonate being about 10 to about 80 parts, about 5 to about 30 parts cryolite, about 10 to about 35 parts titanium dioxide, up to about 20 parts manganese, up to about 2.4 parts silicon, up to about 9 parts columbium and a binder; said electrode containing about 2% to about 4% manganese by weight of the electrode, about 0.4% to about 1% silicon by weight of the electrode and up to about 4% columbium by weight of the electrode.

8. A welding electrode having a core wire containing about 15% to about 45% copper, up to about 10% iron, up to about 8% manganese, up to about 1.5% silicon, about 1% to about 4% aluminum, about 0.3% to about 3% titanium, up to about 0.12% carbon, up to about 2.5% columbium and the balance essentially nickel in amounts of at least about 50% and having a flux containing, in parts by weight, about 10 to about 80 parts manganese carbonate, up to about 40 parts alkaline earth metal carbonate selected from the group consisting of calcium carbonate, barium carbonate, strontium carbonate and combinations thereof, the sum of the manganese carbonate and any alkaline earth metal carbonate being about 10 to about 80 parts, about 5 to about 30 parts cryolite, about 10 to about 35 parts titanium dioxide, up to about 20 parts manganese, up to about 2.4 parts silicon and up to about 9 parts columbium; said electrode containing about 0.5% to about 7% manganese by weight of the electrode, about 0.1% to about 1.3% silicon by weight of the electrode and up to about 4% columbium by weight of the electrode.

References Cited in the file of this patent

UNITED STATES PATENTS

| | | |
|---|---|---|
| 1,679,002 | Pilling | July 31, 1928 |
| 2,745,771 | Pease et al. | May 15, 1956 |
| 3,024,137 | Witherell | Mar. 6, 1962 |

UNITED STATES PATENT OFFICE
CERTIFICATE OF CORRECTION

Patent No. 3,107,176            October 15, 1963

Charles E. Witherell

It is hereby certified that error appears in the above numbered patent requiring correction and that the said Letters Patent should read as corrected below.

Column 3, line 43, for "to" read -- of --; column 11, TABLE IX, sub-heading to column 3, for "$Na_3AlF_1$" read -- $Na_3AlX_6$ --.

Signed and sealed this 5th day of May 1964.

(SEAL)
Attest:

ERNEST W. SWIDER            EDWARD J. BRENNER
Attesting Officer            Commissioner of Patents